(12) United States Patent
Zhou et al.

(10) Patent No.: US 11,347,522 B2
(45) Date of Patent: May 31, 2022

(54) API DYNAMIC PROCESSING IN HCI ENVIRONMENT

(71) Applicant: Dell Products L.P., Round Rock, TX (US)

(72) Inventors: Kai Zhou, Shanghai (CN); Zheng Zhang, Shanghai (CN); Xiaoye Jiang, Shrewsbury, MA (US); Jun Zhan, Shanghai (CN); Somchai Pitchayanonnetr, Quincy, MA (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 16/891,711

(22) Filed: Jun. 3, 2020

(65) Prior Publication Data

US 2021/0382726 A1    Dec. 9, 2021

(51) Int. Cl.
| | | |
|---|---|---|
| *G06F 9/445* | (2018.01) | |
| *G06F 9/455* | (2018.01) | |
| *G06F 9/48* | (2006.01) | |
| *G06F 9/451* | (2018.01) | |

(52) U.S. Cl.
CPC .......... *G06F 9/44505* (2013.01); *G06F 9/451* (2018.02); *G06F 9/45512* (2013.01); *G06F 9/45533* (2013.01); *G06F 9/4806* (2013.01)

(58) Field of Classification Search
CPC .. G06F 9/44505; G06F 9/451; G06F 9/45512; G06F 9/45533; G06F 9/4806
See application file for complete search history.

(56) References Cited

U.S. PATENT DOCUMENTS

| | | | | |
|---|---|---|---|---|
| 8,423,722 | B1* | 4/2013 | Deforest | G06F 3/0613 711/148 |
| 2005/0010547 | A1* | 1/2005 | Carinci | H04L 63/08 |
| 2007/0256085 | A1* | 11/2007 | Reckamp | H04L 67/125 719/327 |
| 2008/0040519 | A1* | 2/2008 | Starr | H04L 69/161 710/39 |
| 2018/0329733 | A1* | 11/2018 | Aronov | G06F 9/5027 |

\* cited by examiner

*Primary Examiner* — Henry Tsai
*Assistant Examiner* — John B Roche
(74) *Attorney, Agent, or Firm* — Jackson Walker L.L.P.

(57) ABSTRACT

An information handling system may include at least one processor; and a non-transitory memory coupled to the at least one processor; wherein the information handling system is configured to manage an information handling system cluster by providing a command line interface between a user and a daemon service configured to execute user commands; wherein the command line interface implements a proxy subcommand that is configured to accept other commands; and wherein, when an other command is received, the daemon service is configured to parse the other command and dispatch the parsed other command to a particular backend service.

20 Claims, 1 Drawing Sheet

API DYNAMIC PROCESSING IN HCI ENVIRONMENT

TECHNICAL FIELD

The present disclosure relates in general to information handling systems, and more particularly to management of servers in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers.

Some examples of HCI systems may operate in various environments (e.g., an HCI management system such as the VMware® vSphere® ESXi™ environment, or any other HCI management system). For purposes of clarity and exposition, the ESXi™ example will be discussed in detail in this disclosure. One of ordinary skill in the art with the benefit of this disclosure will understand that its teachings may be applied to other HCI management systems as well.

In some HCI management systems, command-line interfaces may be used for managing virtual infrastructure. In the example of ESXi™, a set of ESXi™ shell commands referred to as 'esxcli' may be used. A daemon service named 'vmware-hostd' may be responsible for managing all esxcli operations on the ESXi™ environment.

The 'esxcli' command may be used to register customized extensions by following its plug-in definition rules in configuration files. This feature may be used to implement specific functions for different platforms. To add or modify the interface definition of an esxcli plug-in, the vmware-hostd daemon typically needs to be restarted for the new changes to take effect. However, restarting vmware-hostd may require putting the nodes into maintenance mode, because otherwise some important functions (e.g., vMotion/vSAN) may be impacted.

Accordingly, it would be desirable to be able to add or modify the interface definition of an esxcli plug-in, but to avoid restarting the vmware-hostd daemon during such changes in order to reduce cluster maintenance time.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system may include at least one processor; and a non-transitory memory coupled to the at least one processor; wherein the information handling system is configured to manage an information handling system cluster by providing a command line interface between a user and a daemon service configured to execute user commands; wherein the command line interface implements a proxy subcommand that is configured to accept other commands; and wherein, when an other command is received, the daemon service is configured to parse the other command and dispatch the parsed other command to a particular backend service.

In accordance with these and other embodiments of the present disclosure, a method may include an information handling system providing a command line interface between a user and a daemon service configured to execute user commands, the command line interface for management of an information handling system cluster; the command line interface providing a proxy subcommand that is configured to accept other commands; and wherein, when an other command is received, the daemon service is configured to parse the other command and dispatch the parsed other command to a particular backend service.

In accordance with these and other embodiments of the present disclosure, an article of manufacture may include a non-transitory, computer-readable medium having computer-executable code thereon that is executable by a processor of an information handling system for: providing a command line interface between a user and a daemon service configured to execute user commands, the command line interface for management of an information handling system cluster; the command line interface providing a proxy subcommand that is configured to accept other commands; and wherein, when an other command is received, the daemon service is configured to parse the other command and dispatch the parsed other command to a particular backend service.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
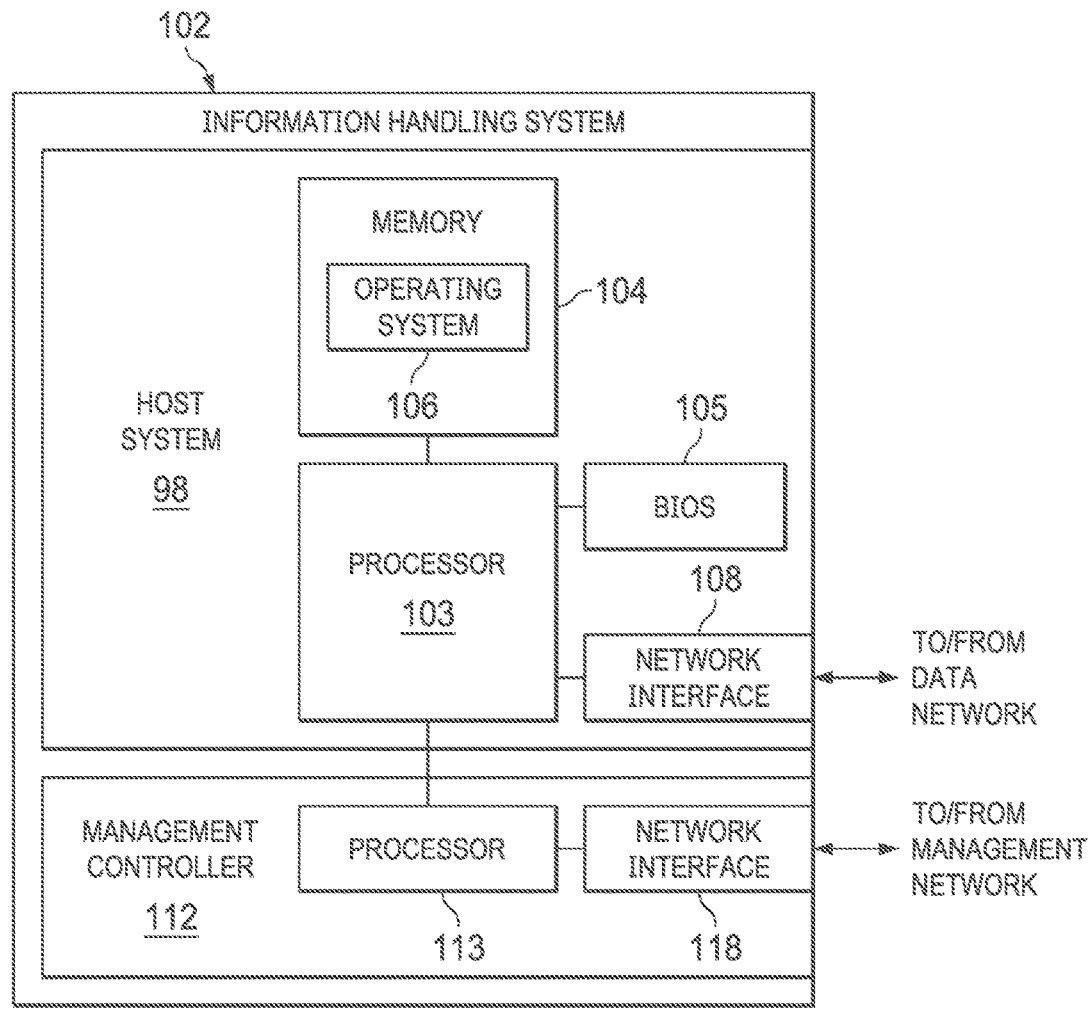
FIG. 1 illustrates a block diagram of an example information handling system, in accordance with embodiments of the present disclosure.
Figure 2:
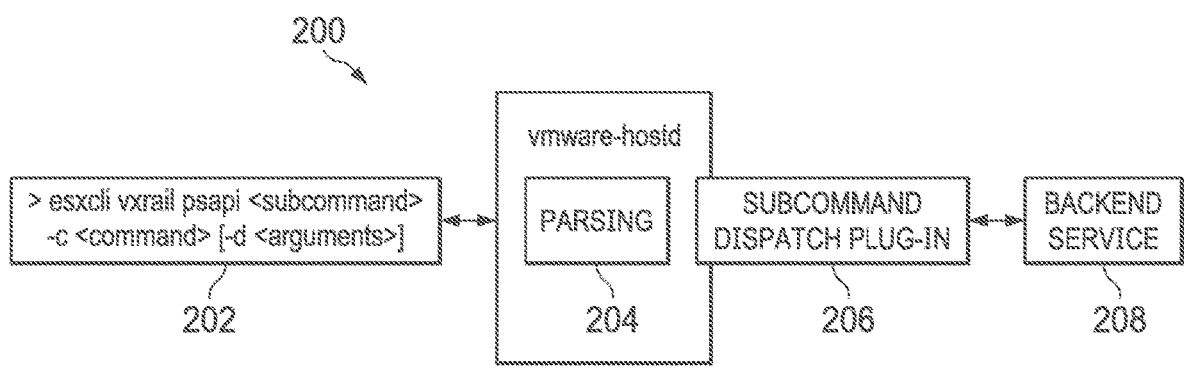
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to be able to add or modify the interface definition of plug-ins for an HCI management system without needing to engage in time-consuming restarts of the corresponding daemon. In the specific example of ESXi™, it would be desirable to be able to add or modify the interface definition of an esxcli plug-in, but to avoid restarting the vmware-hostd daemon during such changes.

Accordingly, in some embodiments, a proxy subcommand may be registered into esxcli. The proxy subcommand definition may be as follows:

esxcli {namespace} <subcommand> -c <command> [-d <arguments>]

In this way, the new request commands can be passed as the parameters of the new proxy subcommand to vmware-hostd. Because this proxy subcommand may keep a consistent interface definition, the vmware-hostd process need not restart.

Turning now to FIG. 2, a flow chart is shown of an example method 200 for using a proxy subcommand to pass parameters to vmware-hostd. At step 202, the esxcli command is called, and a command and its arguments are passed. At step 204, vmware-hostd may parse the command and forward it to a subcommand dispatch plug-in.

At step 206, the subcommand dispatch plug-in sends the request (which includes the original command and arguments) to backend service that is to receive the command.

At step 208, the backend service handles the request from the subcommand dispatch plug-in and returns any response message. The vmware-hostd process may then pass the response back to the caller at the command line.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

In some embodiments, the <subcommand> discussed above may include various possible types of commands. Table 1 below shows three possibilities.

TABLE 1

| Subcommand | Description |
| --- | --- |
| get | Retrieve the specified data with option "-c <command>" |
| post | Pass data to backend-service. The data may be specified by option "-d <arguments>" |
| delete | Delete the data specified by option "-d <arguments>" |

The output of esxcli {namespace}<subcommand> may include several fields in some embodiments. For example, a Status-Code field may indicate that the request has succeeded or failed. A Content-Type field may indicate the type of the message. A Content-Body field may indicate a transaction message.

As one example, a command may be used to query node info:

esxcli vxrail psapi get node.info
Status-Code: 200
Content-Type: application/json
Content-Body: {"name": "vxnode-02", "kernel":" Release build-8294253", "PS-Version": "4.7.100-11277589"}

As another example, a command may be used to reset the BMC of a node:

```
# esxcli vxrail psapi post -d "reboot: immediately"
node.bmc.reset
    Status-Code: 200
    Content-Type: application/json
    Content-Body: {"task-id": "TID-00099ABC9", "Message":"
"operation start successfully"}
```

Embodiments of this disclosure may provide many advantages over existing solutions. The mechanism to provide a flexible interface of esxcli definition methods which can dynamically process a customized application programming interface (API) in an ESXi environment has not heretofore been available. This mechanism may provide more flexible functions for cluster management. Further, as discussed above, it may avoid the necessity for restarting the vmware-hostd process, reducing the maintenance time windows of the nodes.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to manage an information handling system cluster by providing a command line interface between a user and a daemon service configured to execute user commands;
   wherein the command line interface implements a proxy subcommand that is configured to accept other commands; and
   wherein, when an other command is received, the daemon service is configured to parse the other command and dispatch the parsed other command to a particular backend service.

2. The information handling system of claim 1, wherein the command line interface is a portion of a hyper-converged infrastructure (HCI) management system.

3. The information handling system of claim 2, wherein the daemon service is a vmware-hostd service.

4. The information handling system of claim 3, wherein the proxy subcommand is a plug-in of an esxcli command configured to interface with the vmware-hostd service.

5. The information handling system of claim 4, wherein the proxy subcommand is configured to receive new other commands without a restart of the vmware-hostd service.

6. The information handling system of claim 1, wherein the proxy subcommand is further configured to accept arguments for the other commands.

7. The information handling system of claim 6, wherein, when arguments for an other command are received, the daemon service is configured to dispatch the arguments along with the parsed other command to the particular backend service.

8. A method comprising:
   an information handling system providing a command line interface between a user and a daemon service configured to execute user commands, the command line interface for management of an information handling system cluster;
   the command line interface providing a proxy subcommand that is configured to accept other commands; and
   when an other command is received, the daemon service parsing the other command and dispatching the parsed other command to a particular backend service.

9. The method of claim 8, wherein the command line interface is a portion of a hyper-converged infrastructure (HCI) management system.

10. The method of claim 9, wherein the daemon service is a vmware-hostd service.

11. The method of claim 10, wherein the proxy subcommand is a plug-in of an esxcli command configured to interface with the vmware-hostd service.

12. The method of claim 11, wherein the proxy subcommand is configured to receive new other commands without a restart of the vmware-hostd service.

13. The method of claim 8, wherein the proxy subcommand is further configured to accept arguments for the other commands.

14. An article of manufacture comprising a non-transitory, computer-readable medium having computer-executable code thereon that is executable by a processor of an information handling system for:
   providing a command line interface between a user and a daemon service configured to execute user commands, the command line interface for management of an information handling system cluster;

the command line interface providing a proxy subcommand that is configured to accept other commands; and when an other command is received, the daemon service parsing the other command and dispatching the parsed other command to a particular backend service.

15. The article of claim 14, wherein the command line interface is a portion of a hyper-converged infrastructure (HCI) management system.

16. The article of claim 15, wherein the daemon service is a vmware-hostd service.

17. The article of claim 16, wherein the proxy subcommand is a plug-in of an esxcli command configured to interface with the vmware-hostd service.

18. The article of claim 17, wherein the proxy subcommand is configured to receive new other commands without a restart of the vmware-hostd service.

19. The article of claim 14, wherein the proxy subcommand is further configured to accept arguments for the other commands.

20. The article of claim 19, wherein, when arguments for an other command are received, the daemon service is configured to dispatch the arguments along with the parsed other command to the particular backend service.

* * * * *